Patented Jan. 2, 1951

2,536,768

UNITED STATES PATENT OFFICE 2,536,768

PREPARATION OF TUNGSTEN OXIDE CATALYST

Peter William Reynolds and Donald Malcolmson Grudgings, Norton-on-Tees, England, assignors to Imperial Chemical Industries Limited, a corporation of Great Britain No Drawing. Application July 22, 1947, Serial No. 762,793. In Great Britain August 16, 1946

4 Claims. (Cl. 23—140)

This invention relates to the production of alcohols.

In an investigation of the reaction between olefines and water, in the presence of catalysts at elevated temperature, to give alcohols according to the equation $$C_nH_{2n} + H_2O \rightarrow C_nH_{2n+1}OH$$

we have found that with catalysts containing the oxide of tungsten known as blue oxide and having a formula approximating to $W_2O_5$, the previous treatment of the catalyst has a great effect on the yield of product and its constituents.

According to the present invention, in a process for the production of monohydric aliphatic alcohols by reacting an olefine and water at elevated temperature, in the presence of a catalyst containing the blue oxide of tungsten, improved results are obtained by way of increased yields of alcohol, while avoiding the production of undesired by-products, such as polymers, if before being used in the reaction, the catalyst is subjected to a reduction treatment at a temperature not substantially above that at which the reaction is to be carried out.

The present invention also includes catalysts suitable for use in the process.

Catalysts suitable for use according to the present invention may be prepared by a variety of methods. For example, tungstic acid or ammonium paratungstate to which a small portion of graphite has been added, may be pressed into pellets of a suitable size and form, and subjected to the reduction treatment. Alternatively a catalyst may be prepared by precipitating tungstic acid on fragments of a suitable carrier such as alumina or silica, for example in the form of silica gel and subjecting it to the reduction step.

The catalyst may be used in the reaction in any convenient form, for example as powder or carried on supports. We have found it convenient to have the catalyst in the form of pellets.

The catalysts for use in the process of the present invention may be reduced by any convenient means, for example by treating them at the desired temperature with a reducing gas such as hydrogen or carbon monoxide or mixtures containing them. We have found it desirable however to carry out the reduction step by treating the catalyst, at the desired temperature, with a lower monohydric alcohol such as ethanol for a suitable period, for example for 3 hours although longer periods may be used if desired. It is preferable to use a lower aliphatic monohydric alcohol containing not more than four carbon atoms. This treatment with alcohol may be followed, if desired, by a treatment with water, while the catalyst is still at the elevated temperature.

We have found that the process of the present invention gives satisfactory results when the reduction and reaction steps are carried out in the temperature range of from 220° C. to 350° C., particularly when reacting propylene or butenes with water to give the corresponding alcohols. In general a reduction temperature of about 250° C. gives very satisfactory results.

When preparing catalysts in pellet form it is usual to feed the catalyst material to a pelleting machine where it is subjected to pressure in suitable dies whereby pellets are formed. In preparing catalysts in pellet form for use in the process of the invention, we have found it desirable to use a pelleting pressure higher than normally used in order to obtain pellets which after the reduction step, have sufficient mechanical strength and which have less tendency to crumble under the reaction conditions. Furthermore the use of high pelleting pressures makes possible the use of smaller pellets of catalyst which are of adequate mechanical strength, and which at the same time give an enhanced yield of alcohol from a given weight of catalyst. While ordinarily pelleting pressures of about 10 to 30 tons per square inch are usual, we have found it advantageous, according to this feature of the present invention to use pelleting pressures of from about 55 to 65 tons per square inch.

Example 1

Commercial tungstic acid was granulated in a paddle mixer with the addition of water, the granules then being dried and pressed through a Number 10 British Standard Sieve (aperture 1675 $\mu$). The granulated oxide, after the addition of 2% of its weight of graphite powder to act as a pelleting lubricant, was formed into cylinders $\tfrac{3}{16}''$ x $\tfrac{3}{16}''$ on a pelleting machine the pelleting pressure being 32 tons per square inch. The mean vertical crushing strength of the pellets was 162 lbs. per pellet.

450 mls. of this catalyst were charged into a reaction vessel and reduced in the vapour of ethanol at 250° C. for 18 hours at atmospheric pressure, the ethanol passing through the reaction vessel at a rate of 1.1 litres of liquid per litre of catalyst space per hour. The pressure in the reaction vessel was then brought to 250 atmospheres by the introduction of hydrogen and thereafter liquid propylene at a rate of 1.0 litre per hour and liquid water at a rate of 0.5 litres per hour were fed, through a preheater maintained at 250° C., to the reaction vessel. The process was first operated at 250 atmospheres pressure and 250° C., 10% of the propylene fed being converted to isopropanol. After 70 hours the temperature was decreased to 230° C.; at which temperature 6.5% of the propylene fed was converted to isopropanol. After 130 hours total operating time the temperature was raised to 250° C., 10.4% of the propylene fed being converted to isopropanol. The temperature was then increased to 270° C. at which temperature 14.5% of the propylene fed was converted to isopropanol. During the process less than 1% of the propylene fed was converted to polymeric products. There was no evidence of catalyst deterioration after 200 hours total operating time. The discharged catalyst had the decreased mean vertical crushing strength of 47 lbs. per pellet.

Example 2

A similar but more robust catalyst was prepared as described in Example 1, except that the pelleting pressure was 62 tons per square inch and the pellets were cylinders 1/8" by 1/8", the mean vertical crushing strength of the pellets was 102 lbs. per pellet. These pellets were reduced and tested as described in Example 1. At 250° C. 16% of the propylene fed was converted to isopropanol. These catalyst pellets were very strong mechanically and had a mean vertical crushing strength of 80 lbs. per pellet after 300 hours operation in the hydration of propylene.

We claim:

1. A process for the production of catalysts for use in the preparation of monohydric aliphatic alcohols by hydration of olefines with water at elevated temperatures, which comprises pelleting a powdered substance selected from the group consisting of tungstic acid and ammonium paratungstate at high pressure, and subsequently reducing said substance to form blue oxide of tungsten by heating the resulting pellets at a temperature within the range of from 220° to 350° C. in the presence of a reducing agent which is gaseous under normal atmospheric pressures at said temperature.

2. A process for the production of catalysts for use in the preparation of monohydric aliphatic alcohols by hydration of olefines with water at elevated temperatures which comprises pelleting a powdered substance selected from the group consisting of tungstic acid and ammonium paratungstate at a pressure in the range of 55 to 65 tons per square inch and then reducing said substance to form the blue oxide of tungsten by heating the resulting pellets at a temperature within the range of from 220° to 350° C. in the presence of a reducing agent which is gaseous under normal atmospheric pressures at said temperature.

3. A process as claimed in claim 2, in which said reducing agent is a lower aliphatic monohydric alcohol of not more than 4 carbon atoms.

4. A process for the production of catalysts for use in the preparation of monohydric aliphatic alcohols by hydration of olefines with water at elevated temperatures, which comprises pelleting a powdered substance selected from the group consisting of tungstic acid and ammonium paratungstate at high pressure, and subsequently reducing said substance to form blue oxide of tungsten by heating the resulting pellets at a temperature within the range of from 220° to 350° C. with a lower aliphatic monohydric alcohol containing not more than 4 carbon atoms.

PETER WILLIAM REYNOLDS.
DONALD MALCOLMSON GRUDGINGS.

REFERENCES CITED

The following references are of record in the file of this patent:

UNITED STATES PATENTS

| Number | Name | Date |
| --- | --- | --- |
| 1,873,536 | Brown et al. | Aug. 23, 1932 |
| 1,907,317 | Brown et al. | May 2, 1933 |
| 2,184,235 | Groll et al. | Dec. 19, 1939 |
| 2,211,302 | Turkevich et al. | Aug. 30, 1940 |
| 2,408,164 | Foster | Sept. 24, 1946 |

OTHER REFERENCES

Mellor: "Comprehensive Treatise of Inorganic and Theoretical Chemistry"; vol. 11, page 745, published by Longmans, Green, and Co., London 1931.